Figure 1:
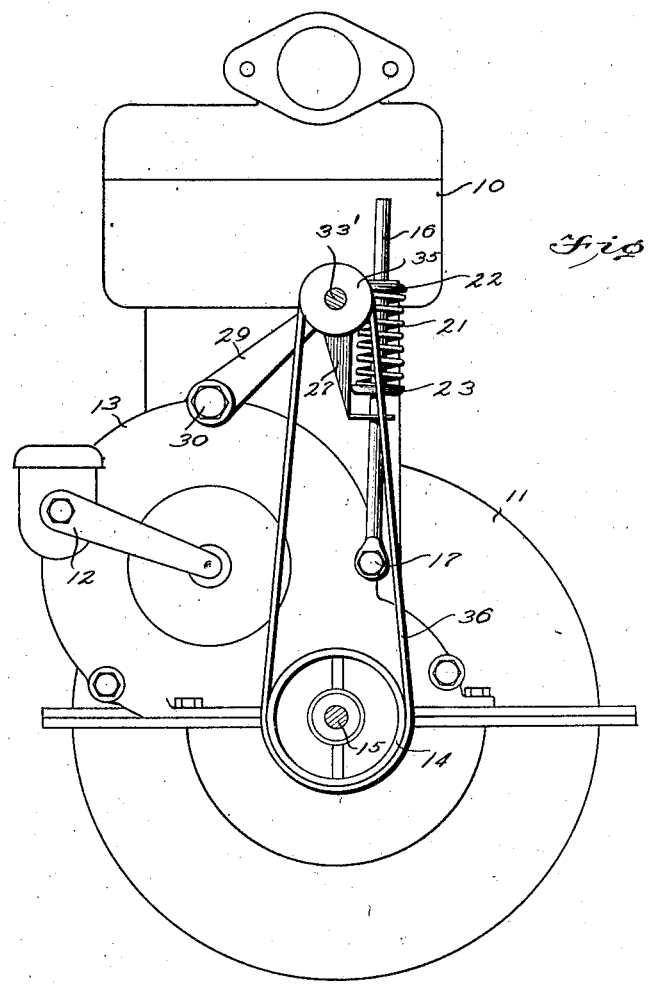

Jan. 9, 1923.

L. N. WYATT ET AL.
BELT TENSION ADJUSTER.
FILED MAR. 19, 1921.

1,441,321

2 SHEETS-SHEET 1

WITNESSES

INVENTOR
L. N. Wyatt,
G. E. Wyatt,
BY

ATTORNEYS

Jan. 9, 1923.
L. N. WYATT ET AL.
BELT TENSION ADJUSTER.
FILED MAR. 19, 1921.
1,441,321
2 SHEETS-SHEET 2
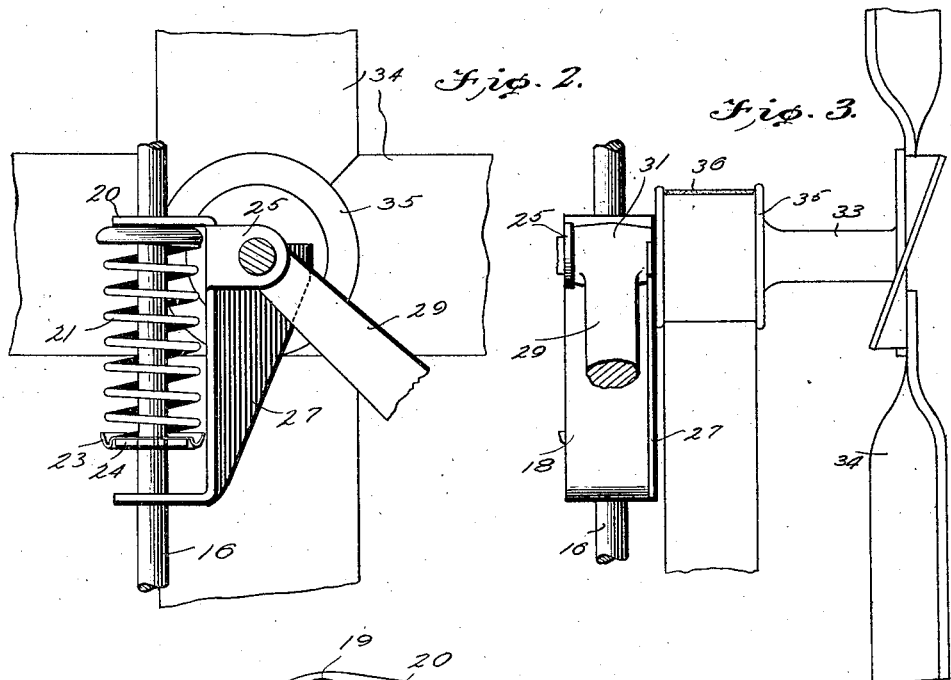
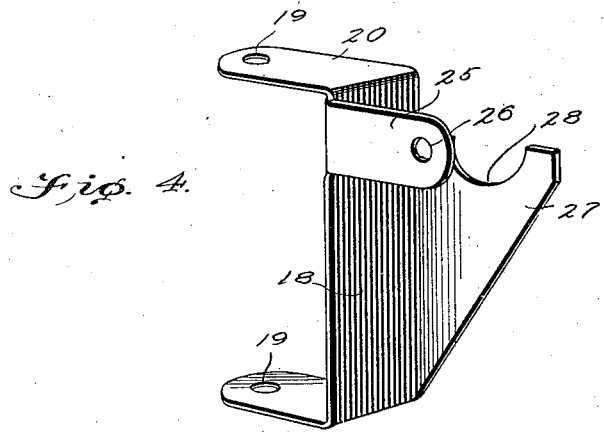
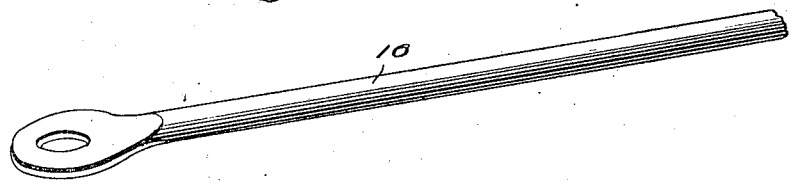
WITNESSES
INVENTOR
L. N. Wyatt,
G. E. Wyatt,
BY
ATTORNEYS Patented Jan. 9, 1923.

1,441,321

UNITED STATES PATENT OFFICE.

LUTHER N. WYATT AND GEORGE E. WYATT, OF DETROIT, MICHIGAN.

BELT-TENSION ADJUSTER.

Application filed March 19, 1921. Serial No. 453,674.

*To all whom it may concern:*

Be it known that we, LUTHER N. WYATT and GEORGE E. WYATT, citizens of the United States, and residents of Detroit, in the county of Wayne and State of Michigan, have invented certain new and useful Improvements in Belt-Tension Adjusters, of which the following is a specification.

This invention relates to a belt tension adjuster which is particularly adapted to be employed in connection with a fan belt of an automobile.

The principal object of the invention is that the belt tension adjusted shall be automatic in operation and at all times maintain the belt under a constant tension. It is also an object of the invention to make the device above referred to simple in construction and positive in its operation.

Other objects and objects relating to the details of construction will appear in the detail description to follow.

The present invention is illustrated in the accompanying drawings as when used in connection with a Ford automobile.

Referring to the drawings,

Figure 1 is a front elevation of an automobile engine of the type above referred to and illustrating the application of my invention, Figure 2 is an enlarged detailed cross section illustrating the manner of mounting the fan, Figure 3 is a detailed side elevation of the fan mounting showing some parts in section to more clearly illustrate the invention, Figure 4 is a detailed view of the fan mounting bracket, and Figure 5 is a detail view of the supporting bar.

Referring to the drawings more particularly 10 indicates generally the automobile engine, 11 the crank case thereof, 12 the breather pipe and 13 the gear housing or casing; also the usual fan driving pulley is shown at 14 and the crank shaft 15 to which it is secured.

In carrying out the present invention a bar 16 is bolted on its one end to the casing 13 as indicated at 17. A channel clip 18 is slidably mounted upon the rod 16 by extending said rod through registering openings 19 formed in each of the sides 20 of said clip. The clip is yieldingly held against downward movement upon the rod or bar 16 by means of a coiled spring 21, said spring being interposed between the cup-shaped members 22 and 23, said members being spaced upon the bar 16 as shown and the lower member 23 held against downward movement by means of a pin as indicated at 24, said pin passing through a suitable transverse opening in the rod 16. The channel clip has otherwise formed thereon a tang 25, the outer end of which is formed with an opening 26, also, a supporting member 27 is formed on the clip, said supporting member having a semi-circular recess 28 formed in the upper edge thereof.

A brace bar 29 has its one end pivotally connected to the casing 13 by means of a bolt or the like as indicated at 30 and its other end formed with an angular transverse portion 31 adapted to seat in the recess 28 of the supporting member 27. An opening is provided through the portion 31 of the rod 29 which is in alignment with the opening 26 of the tang 25, and extended through these openings is a rod 33' upon which there is journaled a sleeve 33, said sleeve having formed or secured on its one end the fan blades generally indicated at 34 and adjacent its other end having formed a belt pulley 35. The rod 33' is suitably held against longitudinal movement by means of suitable nuts threaded or formed on its ends. A belt 36 is passed over the pulleys 34 and 14 by which the fan 34 is driven from the crank shaft of the engine.

The operation of our invention is thought to be apparent from the foregoing description. The coiled spring 21 continuously urges the journal clip 18 upwardly and said journal clip in turn urging upwardly the pulley 35. This creates a constant tension of the belt 36. The belt has no opportunity to slip during operation and thus reduces wear and lengthens the life of the belt.

While we have shown and described our invention as when incorporated with a particular type of engine or automobile, we wish it to be understood that we are not to be so limited as indicated by the appended claims.

We claim:

1. A yieldable mounting means for a pulley, comprising in combination, a supporting rod, a channeled clip having its ends slidably connected with said rod, a coil about said rod and interposed between the sides of the channeled clip, means for holding said coiled spring against movement in one direction upon the rod and supporting means formed upon said clip upon which a pulley may be rotatably mounted.

2. In combination, a stationary pulley, a second pulley spaced from the stationary pulley and in alignment therewith, means for mounting the second pulley so that it may be yieldably drawn toward the stationary pulley, said means including a supporting rod, a channel clip having each of its ends formed with an opening adapted to slidingly receive the supporting rod, a coiled spring about the supporting rod and interposed between the sides of said channel clip, means for securing the spring coil against movement in one direction, supporting means formed on the channel clip upon which the second pulley may be rotatably mounted, and a second supporting rod having its one end connected to the channel clip and its other end connected in such a manner that the rod may swing in a plane similar to the movement of the channel clip when drawn against the tension of the coiled spring.

3. In combination, a stationary pulley, a second pulley spaced from the stationary pulley in alignment therewith, means for mounting the second pulley so that it may be yieldably drawn toward the stationary pulley, said means including a supporting rod, a channel clip having each of its ends formed with an opening adapted to slidingly receive the supporting rod and interposed between the sides of said channel clip, means for securing the spring coil against movement in one direction, and supporting means carried by said channel clip upon which the second pulley may be rotatably mounted.

LUTHER N. WYATT.
GEORGE E. WYATT.